(12) United States Patent
Beekman

(10) Patent No.: US 7,409,899 B1
(45) Date of Patent: Aug. 12, 2008

(54) OPTICAL DETECTION AND LOCATION OF GUNFIRE

(75) Inventor: Daniel W. Beekman, Ellicott City, MD (US)

(73) Assignee: The United States of America as represented by the Secretary of Army, Washington, DC (US)

( * ) Notice: Subject to any disclaimer, the term of this patent is extended or adjusted under 35 U.S.C. 154(b) by 437 days.

(21) Appl. No.: 10/997,007

(22) Filed: Nov. 26, 2004

(51) Int. Cl.
*F41G 3/04* (2006.01)
(52) U.S. Cl. ................. 89/1.11; 89/41.06; 89/41.08
(58) Field of Classification Search ............. 89/41.06, 89/41.08, 1.11
See application file for complete search history.

(56) References Cited

U.S. PATENT DOCUMENTS

| | | | |
|---|---|---|---|
| 3,936,822 A | 2/1976 | Hirschberg | |
| 5,686,889 A | 11/1997 | Hillis | |
| 5,970,024 A | 10/1999 | Smith | |
| 5,973,998 A | 10/1999 | Showen et al. | |
| 6,215,731 B1 | 4/2001 | Smith | |
| 6,496,593 B1 | 12/2002 | Krone, Jr. et al. | |
| 6,621,764 B1 * | 9/2003 | Smith | 367/128 |
| 7,233,546 B2 * | 6/2007 | Berkovich et al. | 367/128 |

* cited by examiner

*Primary Examiner*—Stephen M Johnson
(74) *Attorney, Agent, or Firm*—William W. Randolph; Guy M. Miller

(57) ABSTRACT

Disclosed is an optical gunfire detection system comprising an image-capturing device operable for detecting light; a narrowband Fraunhofer line filter connected to the image-capturing device, and operable for partially restricting transmission of the light; a convex parabolic reflector operable for transmitting images to the image-capturing device; a lens system; an image storage device connected to the image-capturing device, wherein the image storage device comprises a solid-state digital memory unit operable to store multiple seconds of video imagery; a real-time computer-implemented mechanism connected to the image storage device, the computer-implemented mechanism operable for detecting locations and classifications of gunfire associated with the images; an acoustic device in communication with the computer-implemented mechanism, and operable for verifying the classifications of the gunfire; a position laser operable for identifying the locations of the gunfire; and a defense mechanism comprising the laser pointer and operable to defend against a source of the gunfire.

10 Claims, 6 Drawing Sheets

OPTICAL DETECTION AND LOCATION OF GUNFIRE

GOVERNMENT INTEREST

The invention described herein maybe manufactured, used, and/or licensed by or for the United States Government.

BACKGROUND OF THE INVENTION

1. Field of the Invention

The invention generally relates to weapon fire detection, and more particularly to a hemispherical field-of-view optical system and method for the detection and location of sniper gunfire.

2. Description of the Related Art

Snipers present a significant hazard to deployed soldiers and to the public at large. Single-shot gunfire events are difficult to locate, thus snipers tend to escape detection and, in the absence of credible detection and retaliation capability, constitute a repetitive and dangerous hazard. A sniper shot can be detected both by the muzzle blast and by the bullet shock wave. A conventional acoustic array can determine the direction and range from which the shot is fired with reasonable accuracy, and may provide classification and possible identification of the weapon based on acoustic signatures. Acoustic systems may also detect supersonic bullets, and provide additional discrimination against noise (i.e., fireworks, blanks, etc.). Usually, conventional optical weapon fire detection systems sense the optical energy released or generated when a weapon is discharged.

Acoustic and optical gunfire detection and location systems exist, such as those described in U.S. Pat. No. 3,936,822 issued to Hirschberg on Feb. 3, 1976, U.S. Pat. No. 5,970,024 issued to Smith on Oct. 19, 1999, and U.S. Pat. No. 6,215,731 issued to Smith on Apr. 10, 2001, the complete disclosures of which are herein incorporated by reference. Generally, acoustic systems use multiple widely spaced microphones with algorithms, which use relative detection times to obtain an approximate direction of the gunfire event, for providing a probable classification and identification of the weapon used. However, acoustic systems generally provide an approximate line-of-bearing with an approximate range. Therefore, the location of the sniper shooter may not be sufficiently precise to accurately return defensive fire.

Further, optical systems may not provide a very wide field-of-view, thereby limiting the probability of detecting gunfire at any given moment. Generally, optical systems exploit spectral signatures of gunfire, which can enhance detection and reduce false alarms. The lack of an efficient wide field-of-view optical weapon fire detection system may be a significant handicap in current military operations as well as in pseudo-military and non-military settings.

Therefore, there is a need for an improved very wide field-of-view optical system capable of detecting, documenting, and identifying gunfire events, which can accurately determine the direction of the gunfire and provide necessary information for effective retaliation.

SUMMARY OF INVENTION

In view of the foregoing, the invention comprises an optical gunfire detection system comprising an image-capturing device operable for detecting light, wherein the light comprises any of ultraviolet, visible, or infrared light; a narrowband Fraunhofer line filter connected to the image-capturing device, and operable for partially restricting transmission of the light; a quadric reflector operable for transmitting images to the image-capturing device, wherein the quadric reflector is capable of providing a field-of-view of 360 degrees azimuth and at varying elevations with respect to the horizon. Quadric surfaces include spheres, paraboloids, hyperboloids, and ellipsoids, and will be exemplified hereafter by a convex paraboloid. Such surfaces have one or more axes of radial symmetry and a corresponding azimuthal plane perpendicular to each symmetry axis. The invention also comprises a lens system, wherein the lens system is positioned along the symmetry axis of the parabolic reflector and provides a circular field-of-view centered on the symmetry axis; an image storage device connected to the image-capturing device, wherein the image storage device comprises a solid-state digital memory unit operable to store multiple seconds of video imagery; a real-time computer implemented mechanism connected to the image storage device, the computer-implemented mechanism operable for detecting locations of gunfire associated with the images and classifying the type of weapon used; an acoustic device in communication with the computer-implemented mechanism, and operable for verifying the classifications of the gunfire; a position or designator laser operable for identifying the locations of the gunfire; and a defense mechanism comprising the designator laser and operable to defend against a source of the gunfire. The reflector and lens system cooperate to provide a nearly spherical field of view coverage for detection of possible gunshot events.

The real-time computer implemented mechanism comprises a program storage device readable by computer, tangibly embodying a program of instructions executable by the computer to perform a method of weapon identification, wherein the method comprises identifying a potential gunfire event; determining optical signatures of the gunfire event, wherein the optical signatures comprise spectral, spatial, and temporal optical signatures; comparing the optical signatures with known signatures of known gunfire events; and correlating optical gunfire event detection, classification, and identification with acoustic gunfire event detection, classification, and identification to identify a weapon producing the gunfire.

The optical gunfire detection system may further comprise a mirror, wherein the mirror is positioned along an axis of the parabolic reflector, and wherein the mirror provides an increased resolution of the images; and a zoom lens positioned between the mirror and the image-capturing device, wherein the zoom lens provides an increased magnification and resolution of the images.

The invention also comprises a method of detecting sniper gunfire comprising observing images in a field-of-view using a convex parabolic reflector; transmitting the images to an image-capturing device, wherein the image-capturing device detects light, wherein the light comprises any of ultraviolet, visible, or infrared light; storing the images in an image storage device, wherein the image storage device comprises a solid-state digital memory unit operable to store multiple seconds of video imagery; using a real-time computer-implemented mechanism connected to the image storage device to detect locations and classifications of gunfire associated with the images; verifying the classifications of the gunfire using an acoustic device in communication with the computer-implemented mechanism; and identifying the locations of the gunfire using a position or designator laser. The method further comprises partially restricting transmission of the light using a narrowband Fraunhofer line filter; providing an azimuthal field-of-view of 360-degrees using the convex parabolic reflector; defending against a source of the gunfire using a defense mechanism; providing an axial field-of-view using a lens system, wherein the lens system is positioned along an axis of the parabolic reflector; and increasing the resolution of the images using a mirror, wherein the mirror is positioned along the symmetry axis of the parabolic reflector. Also, the method comprises increasing the magnification and resolution of the images using a zoom lens positioned in between the mirror and the image-capturing device.

The invention provides a relatively simple optical system with a very large view of the surrounding environment and with digital video storage capabilities for detecting sniper gunfire. Also, the invention provides optical confirmation of a gunfire event by using an acoustic device in communication with a computer-implemented mechanism, thereby reducing false alarms. Moreover, the invention provides verification of the direction from which the shot was fired with improved accuracy and precision. Additionally, the invention provides the approximate range to the shooter based on the time from the optically detected muzzle flash to the acoustic detection of the associated sound. Furthermore, the invention provides a digital video image of the gunfire location, providing a means for locating and pursuing the shooter, and for retaliation. In addition to the above, the invention also provides for the classification and identification of the weapon used based on the combination of optical and acoustic, spectral, spatial, and temporal signatures.

These and other aspects and advantages of the invention will be better appreciated and understood when considered in conjunction with the following description and the accompanying drawings. It should be understood, however, that the following description, while indicating preferred embodiments of the invention and numerous specific details thereof, is given by way of illustration and not of limitation. Many changes and modifications may be made within the scope of the invention without departing from the spirit thereof, and the invention includes all such modifications.

BRIEF DESCRIPTION OF THE DRAWINGS

The invention will be better understood from the following detailed description of the preferred embodiments of the invention with reference to the drawings, in which.

DETAILED DESCRIPTION OF THE INVENTION

Figure 1:
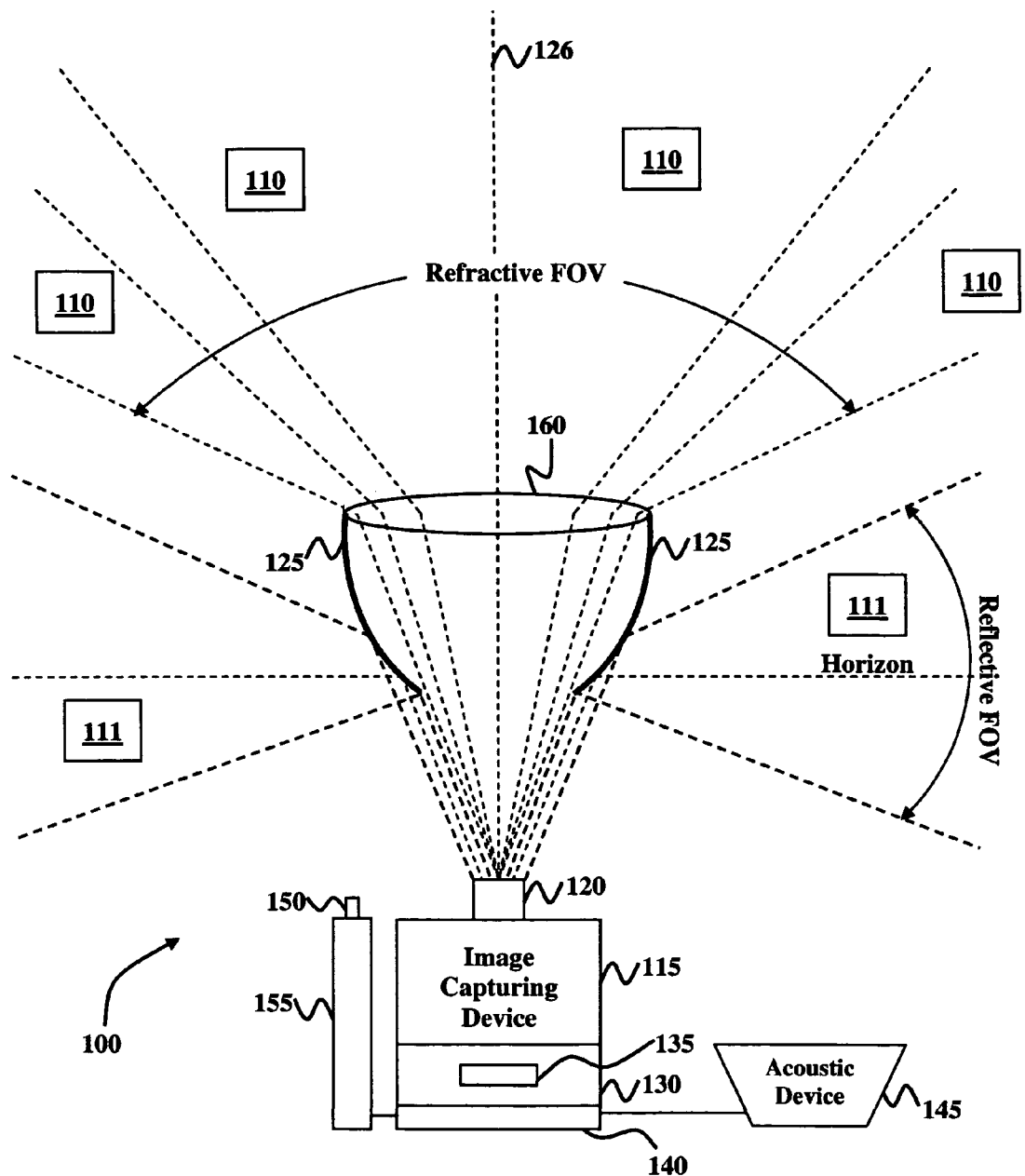
FIG. 1 is a schematic diagram illustrating an optical gunfire detection system according to an embodiment of the invention.

The invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the invention. The examples used herein are intended merely to facilitate an understanding of ways in which the invention may be practiced and to further enable those of skill in the art to practice the invention. Accordingly, the examples should not be construed as limiting the scope of the invention.

As previously mentioned, there is a need for a very large field-of-view optical system and video capturing mechanism for image storage to detect and document gunfire events, and to provide means for identification of and retaliation against a sniper or shooter. Referring now to the drawings, and more particularly to FIGS. 1 through 6, there are shown preferred embodiments of the invention.

As illustrated in FIG. 1, an embodiment of the invention provides an optical gunfire detection system 100 comprising an image-capturing device 115 operable for detecting light, wherein the light comprises any of ultraviolet, visible, or infrared light; a narrowband Fraunhofer line filter 120 connected to the image-capturing device 115, and operable for partially restricting transmission of the light; a convex parabolic reflector 125 operable for transmitting images to the image-capturing device 115, wherein the convex parabolic reflector 125 is capable of providing an azimuthal field-of-view 111 of 360 degrees; a lens system 160, wherein the lens system 160 is positioned along the axis 126 of the convex parabolic reflector 125. In FIG. 1, the system 100 is orientated in an upward position with the axis 126 of the system pointed vertically so that the lens system 160 provides a vertical field-of-view 110 about the zenith and the parabolic reflector provides a 360 degree field-of-view 111 including the entire horizon. The gunfire detection system also includes an image storage device 130 connected to the image-capturing device 115, wherein the image storage device 130 comprises a solid-state digital memory unit 135 operable to store multiple seconds of video imagery; a real-time computer-implemented mechanism 140 connected to the image storage device 130, wherein the computer-implemented mechanism 140 is operable for detecting locations and classifications of gunfire associated with the images 110.

The system 100 further comprises an acoustic device 145 in communication with the computer-implemented mechanism 140, and operable for verifying the classifications of the gunfire; a position laser or laser designator 150 operable for identifying the locations of the gunfire; and a defense mechanism 155 comprising the laser designator 150 and operable to defend against a source of the gunfire. The defense mechanism 155 preferably is in communication with the computer-implemented mechanism 140. FIG. 1 illustrates various lines-of-sight as indicated by the dotted lines and illustrates the reflective 111 and refractive 110 fields-of-view (FOV).

Figure 2:
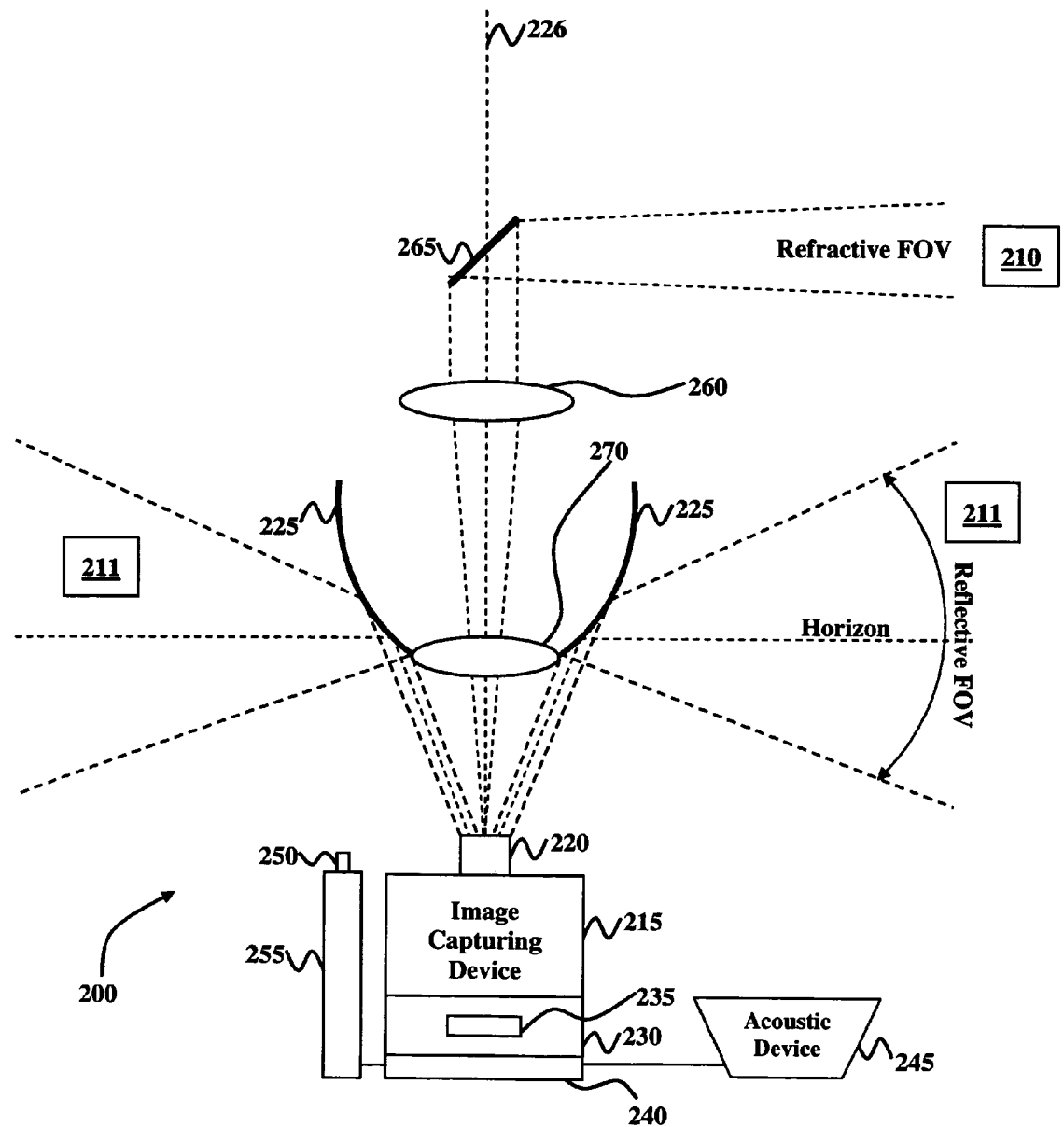
FIG. 2 is a schematic diagram illustrating an optical gunfire detection system according to an alternate embodiment of the invention.

In the systems 100 and 200 shown in FIGS. 1 and 2, the parabolic shape of the parabolic reflector 125 is a member of a family of quadrics. A quadric is a quadratic surface, defined by equations of second degree in three variables, including spheres, paraboloids, ellipsoids, and hyperboloids. Thus, while the reflector 125 is shown as a convex parabolic reflector in the preferred embodiments of FIGS. 1 and 2, a more general description of the reflector would be a quadric reflector. The quadric reflectors have at least one axis of symmetry. In FIG. 1, the axis of symmetry 126 is the vertical dashed line in the middle of the figure and extending through the middle of the reflector 125 and pointed at the center of the camera. In FIG. 2 the axis of symmetry 226 is similarly shown. If the axis of symmetry is oriented vertically (e.g. pointed toward the zenith), a 360 degree azimuth angle includes the entire horizon. A vertical orientation of the systems 100, 200 would be one preferred operating position for use of the systems.

The function of a Fraunhofer line filter is to eliminate the solar background. Only a narrow range of wavelengths is transmitted, specifically that in which the intensity of sunlight is very low (see Fundamentals of Optics, by Jenkins and White, McGraw-Hill, 1957 and also at www.daystar-filters.com). This allows detection of a moderately bright light source without having an intense solar background interfering with the measurement/detection In a second embodiment shown in FIG. 2, an optical gunfire detection system 200 comprises an image-capturing device 215 operable for detecting light, wherein the light comprises any of ultraviolet, visible, or infrared light; a narrowband Fraunhofer line filter 220 connected to the image-capturing device 215, and operable for partially restricting transmission of the light; a convex parabolic reflector 225 operable for transmitting images to the image-capturing device 215, wherein the convex parabolic reflector 225 is capable of providing an azimuthal field-of-view 211 of 360-degrees; an image storage device 230 connected to the image-capturing device 215, wherein the image storage device 230 comprises a solid-state digital memory unit 235 operable to store multiple seconds of video imagery.

The system 200 further comprises a real-time computer-implemented mechanism 240 connected to the image storage device 230, the computer-implemented mechanism 240 operable for detecting locations and classifications of gunfire associated with the images; an acoustic device 245 in communication with the computer-implemented mechanism 240, and operable for verifying the classifications of the gunfire; a laser designator 250 operable for identifying the locations of the gunfire; and a defense mechanism 255 comprising the laser designator 250 and operable to defend against a source of the gunfire.

Further, the system 200 comprises a lens system 260, wherein the lens system 260 is positioned along an axis 226 of the convex parabolic reflector 225 and provides an axial field-of-view 210 about the axis 226 (or about the zenith with a vertical orientation of the system 200); a mirror 265, wherein the mirror 265 is positioned along an axis 226 of the convex parabolic reflector 225, and wherein the mirror 265 provides an increased resolution within the axial field-of-view 210; and a zoom lens 270 positioned between the mirror 265 and the image-capturing device 215, wherein the zoom lens 270 provides an increased magnification and resolution of the images. FIG. 2 illustrates various lines-of-sight as indicated by the dotted lines and illustrates the reflective 211 and refractive 210 fields-of-view (FOV).

Figure 3:
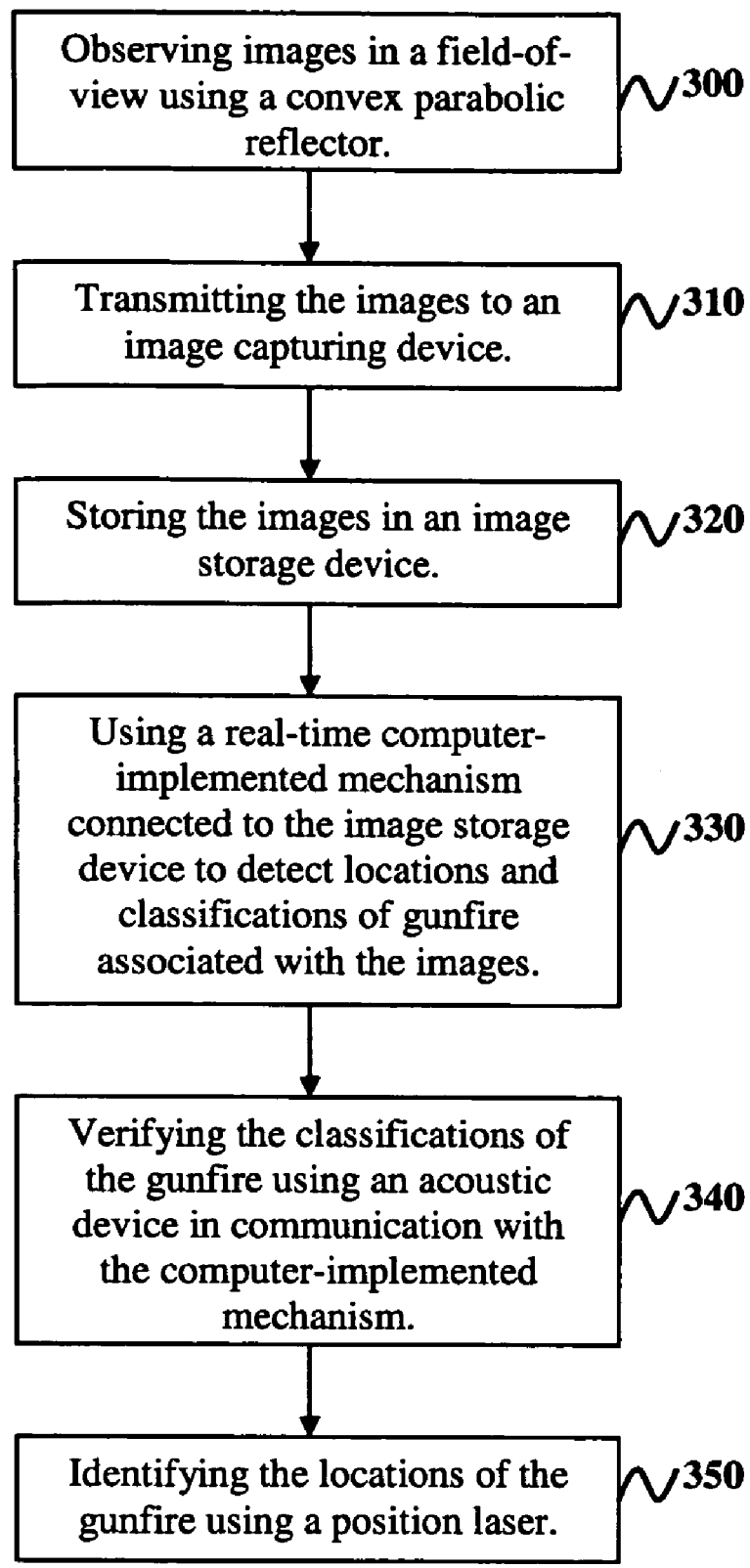
FIG. 3 is a flow diagram illustrating a preferred method of the invention.

A flow diagram illustrating a preferred method of the invention is shown in FIG. 3, wherein the method of detecting sniper gunfire comprises observing 300 images 110, 111, 210, 211 in a field-of-view using a convex parabolic reflector 125, 225; transmitting 310 the images 110, 111, 210, 211 to an image-capturing device 115, 215, wherein the image-capturing device 115, 215 detects light, wherein the light comprises any of ultraviolet, visible, or infrared light; storing 320 the images 110, 111, 210, 211 in an image storage device 130, 230, wherein the image storage device 130, 230 comprises a solid-state digital memory unit 135, 235 operable to store multiple seconds of video imagery; using 330 a real-time computer-implemented mechanism 140, 240 connected to the image storage device 130, 230 to detect locations and classifications of gunfire associated with the images 110, 111, 210, 211; verifying 340 the classifications of the gunfire using an acoustic device 145, 245 in communication with the computer-implemented mechanism 140, 240; and identifying 350 the locations of the gunfire using a laser designator or position laser 150, 250.

Figure 4:
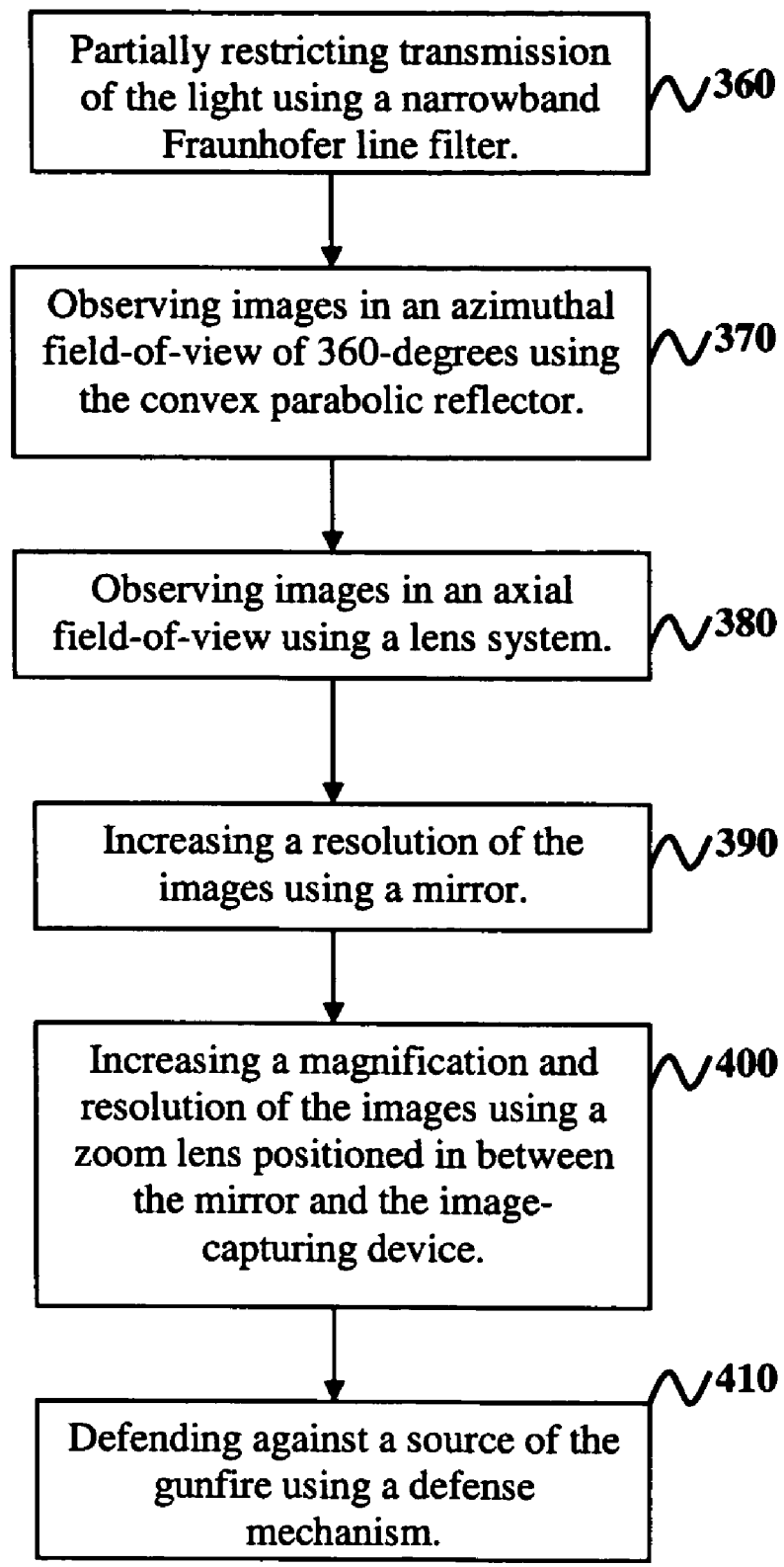
FIG. 4 is a flow diagram illustrating a preferred method of the invention.

As illustrated in the flow diagram of FIG. 4, the method further comprises partially restricting 360 transmission of the light using a narrowband Fraunhofer line filter 120, 220. Further, the method comprises providing 370 an azimuthal field-of-view of 360 degrees using the convex parabolic reflectors 125, 225, observing 380 an axial field-of-view using a lens system 160, 260, 270 wherein the lens system 260 is positioned along an axis 226 of the convex parabolic reflector 225. The method further includes increasing 390 the resolution of the images 110, 210 using a mirror 265, wherein the mirror 265 is positioned along an axis of the convex parabolic reflector 225; and increasing 400 the magnification and resolution of the images 110, 210 using a zoom lens 270 positioned in between the mirror 265 and the image-capturing device 215; and defending 410 against a source of the gunfire using a defense mechanism 155, 255.

The optical system 100, 200 essentially observes a nearly spherical scene in all directions while monitoring the imagery for signs of gunfire. The color spectrum, shape, and duration of all bright flashes would be compared to known gunfire signatures to discriminate gunfire events from other bright flashes such as solar glints, flash photography, etc. using the acoustic device 145, 245 in combination with the computer-implemented mechanism 140, 240.

Figure 5:
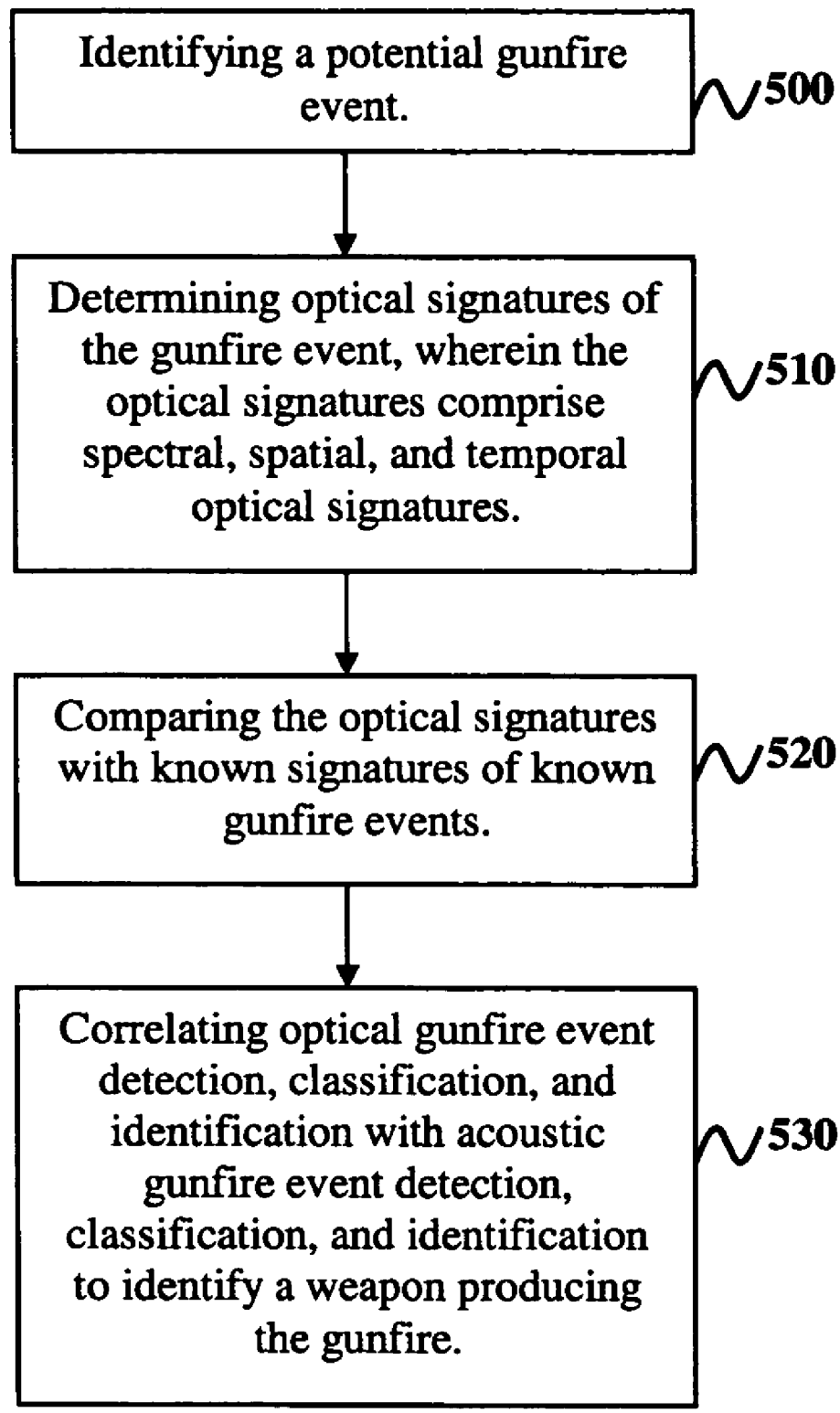
FIG. 5 is a flow diagram illustrating a method of an aspect of the invention.

The real-time computer implemented mechanism 140, 240 comprises a program storage device readable by a computer 10, tangibly embodying a program of instructions executable by the computer 10 to perform a method of weapon identification, wherein the method, which is illustrated in the flow diagram of FIG. 5, comprises identifying 500 a potential gunfire event; determining 510 optical signatures of the gunfire event, wherein the optical signatures comprise spectral, spatial, and temporal optical signatures; comparing 520 the optical signatures with known signatures of known gunfire events; and correlating 530 optical gunfire event detection, classification, and identification with acoustic gunfire event detection, classification, and identification to identify a weapon producing the gunfire.

The real-time algorithm software automatically detects sniper events, and determines the direction and range of the shooter and is able to classify and/or identify the weapon used using a comparison to a saved library of known signatures of known gunfire events. That is, it compares the gunfire event to a previous gunfire event saved in its memory embodied as a computerized library. Moreover, the software compares results of the optical signatures with that of acoustic signatures to provide verification and to reduce false alarms.

Thus, the invention uses software to (1) identify the weapon where the gunfire is emanating from and (2) comparing this to a saved library of known signatures of known gunfire events. However, these signatures are not merely acoustic signatures; rather, the invention also includes optical signatures as described above in conjunction with the acoustic signatures described above to provide the comparison. Moreover, the invention uses the results of the optical signatures and compares it with the acoustic signatures in determining if (1) a weapon is the source of the noise (as opposed to other noises) and (2) to verify that classification of the gunfire.

Figure 6:
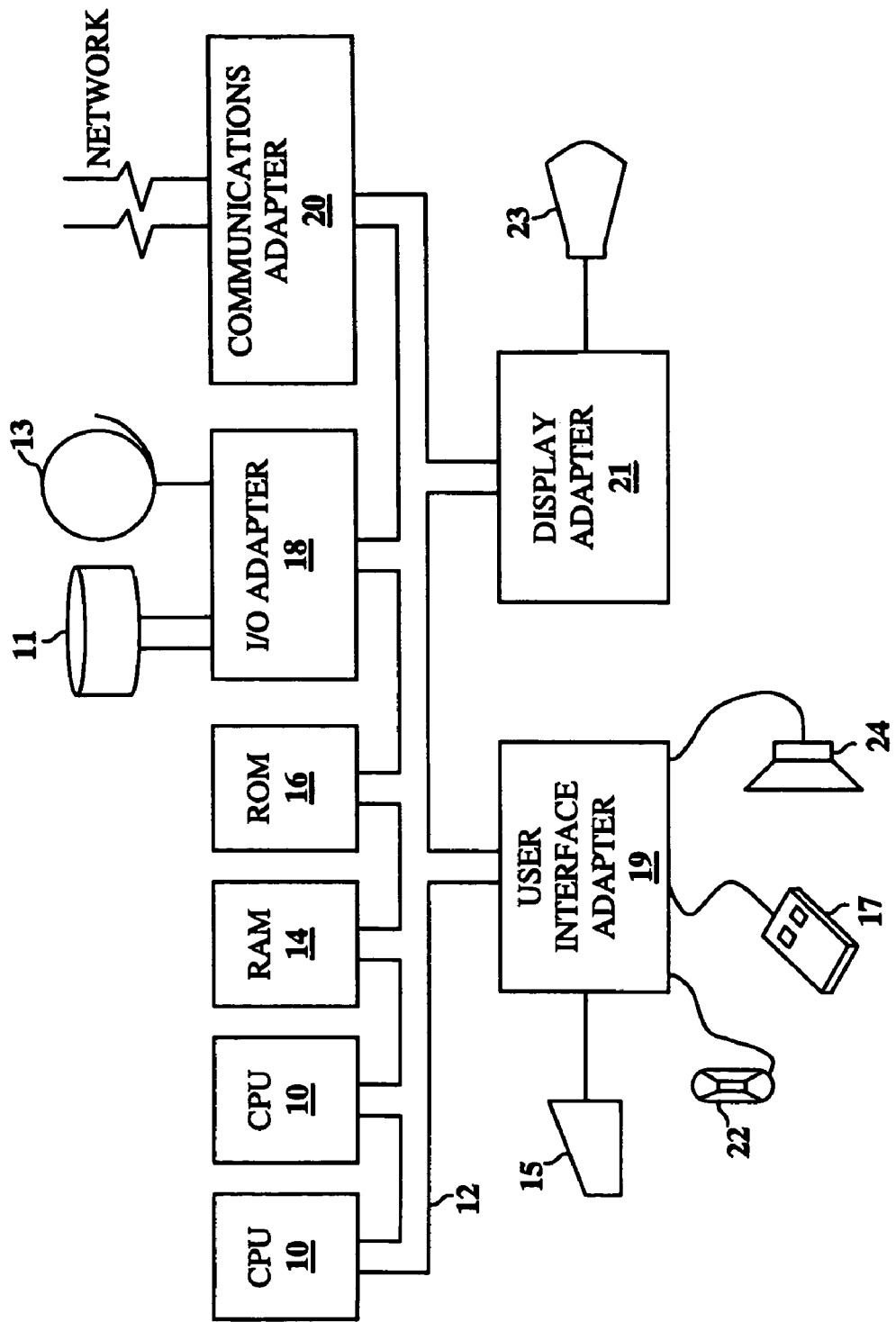
FIG. 6 is a system diagram of the invention.

A representative hardware environment for practicing the present invention is depicted in FIG. 6, which illustrates a typical hardware configuration of an information handling/computer system in accordance with the invention, having at least one processor or central processing unit (CPU) 10. The CPUs 10 are interconnected via system bus 12 to random access memory (RAM) 14, read-only memory (ROM) 16, an input/output (I/O) adapter 18 for connecting peripheral devices, such as disk units 11 and tape drives 13, to bus 12, user interface adapter 19 for connecting keyboard 15, mouse 17, speaker 24, microphone 22, and/or other user interface devices, such as a touch screen device, to bus 12, communication adapter 20 for connecting the information handling system to a data processing network, and display adapter 21 for connecting bus 12 to display device 23. A program storage device readable by the disk or tape units is used to load the instructions, which operate the invention, which is loaded onto the computer system.

The image-capturing device 115, 215 is preferably a digital video camera comprising a microprocessor chip and the image storage device 130, 230. The microprocessor chip is capable of implementing and running algorithm-based software for computerized processing of the images 110, 210. The image storage device 130, 230 is preferably a digital video storage device capable of capturing and storing several seconds of video imagery for subsequent display on a monitor or display device 23. The solid-state image storage device 130, 230 is preferably used in a "continuous loop" mode to capture data prior to the identification of a gunfire event, either by analysis of the image data or by detection of an acoustic gunfire signature. The video memory device 130, 230 would therefore always comprise the last few seconds (or minutes) of image data. The older (or oldest) data stored in the image storage device 130, 230 would be continuously overwritten until a gunfire event is detected, at which time relevant frames of video would be quickly identified and stored. Thus, the video memory device 130, 230 could be used to continuously record imagery until an event was detected either by the acoustic device 145, 245 or by the optical signature algorithm software, and then relevant frames of images can be saved for further processing and/or transmission on a display unit 102.

The image data could also be used to provide feedback on a retaliation system 155, 255 which comprises the laser designator 150, 250 to guide return fire from nearby personnel, or some other weapon system which could be then aimed at the origin of the gunfire. The retaliation system 155, 255 may comprise weaponry, or other similar defense mechanisms or devices known in the art. The laser designator 150, 250 aids in specifically depicting the location of the gunfire. Preferably, the laser designator 150, 250 is a low-power laser such as a red helium-neon laser or a semiconductor laser, etc., which can be precisely steered to produce a visible spot at the location of the detected gun flash. The advantage of this is that nearby personnel need not directly view the display 23 to determine the location of the shooter; rather they can view the location directly in the field of vision. The optical system 100, 200 could be used as a stand-alone system, or preferably could be used most effectively in conjunction with other acoustic gunfire detection systems to confirm simultaneous optical and acoustic gunfire signatures.

The invention provides a relatively simple optical system with digital video storage capabilities for detecting sniper gunfire. Also, the invention provides optical confirmation of the gunfire event by using an acoustic device in communication with a computer-implemented mechanism, thereby reducing false alarms. Moreover, the invention provides verification of the direction from which the shot was fired with improved accuracy and precision. Additionally, the invention provides an approximate range to the shooter based on the time from the optically detected muzzle flash to the acoustic detection of the associated sound. Furthermore, the invention provides a digital video image of the sniper location (and the shooter) providing a means for locating and pursuing the sniper, and for retaliation. In addition to the above, the invention also provides for the classification and identification of the weapon used based on the combination of optical and acoustic spectral, spatial, and temporal signatures.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the invention has been described in terms of preferred embodiments, those skilled in the art will recognize that the invention can be practiced with modification within the spirit and scope of the appended claims.

What is claimed is:

1. A method of detecting sniper gunfire, said method comprising:
    observing images in a field-of-view using a quadric reflector;
    transmitting said images to an image-capturing device;
    storing said images in an image-storage device;
    using a real-time computer-implemented mechanism connected to said image storage device to detect locations and classifications of gunfire associated with said images;
    verifying said classifications of the gunfire using an acoustic device in communication with said computer-implemented mechanism; and
    identifying said locations of the gunfire using a position laser.

2. The method of claim 1, wherein said image-capturing device detects light, wherein the light comprises any of visible light, near-infrared light, and short-wave infrared light.

3. The method of claim 2, further comprising partially restricting transmission of said light using a narrowband Fraunhofer line filter.

4. The method of claim 1, wherein said image storage device comprises a solid-state digital memory unit operable to store multiple seconds of video imagery.

5. The method of claim 1, further comprising providing a 360 degree azimuthal field-of-view using said quadric reflector, wherein said quadric reflector is a convex parabolic reflector.

6. The method of claim 1, further comprising defending against a source of the gunfire using a defense mechanism.

7. The method of claim 1, further comprising increasing an axial field-of-view using a lens system, wherein said lens system is positioned along the symmetry axis of said quadric reflector.

8. The method of claim 1, further comprising increasing the resolution of said images using a mirror, wherein said mirror is positioned along an axis of said quadric reflector.

9. The method of claim 8, further comprising increasing a magnification and resolution of said images using a zoom lens positioned in between said mirror and said image-capturing device.

10. The method of claim 1, wherein said real-time computer-implemented mechanism comprises a program storage device readable by computer, tangibly embodying a program of instructions executable by said computer to perform a method of weapon identification, said method comprising:
    identifying a potential gunfire event;
    determining optical signatures of the gunfire event, wherein said optical signatures comprise spectral, spatial, and temporal optical signatures;
    comparing said optical signatures with known signatures of known gunfire events; and
    correlating optical gunfire event detection, classification, and identification with acoustic gunfire event detection, classification, and identification to identify a weapon producing the gunfire.

* * * * *